Patented Apr. 11, 1944

2,346,232

UNITED STATES PATENT OFFICE 2,346,232

MEAT PROCESS

Edgar L. Piret, St. Paul, and Edward C. Ritchell, Minneapolis, Minn., assignors to Regents of the University of Minnesota, Minneapolis, Minn., a corporation of Minnesota No Drawing. Application February 14, 1942, Serial No. 430,952

12 Claims. (Cl. 99—208)

This invention relates to improved meat treating processes and the resulting meat products, and more particularly to improved processes of very rapidly producing dehydrated meat and meat products, and to the resultant new products.

In the natural, raw state, lean meat muscle contains from 75 to 85% water and forms an ideal medium for the action of enzymes and microbiological forms such as bacteria and molds. Unless meat is refrigerated, dehydrated, "cured" or otherwise preserved, these microbiological actions proceed rapidly, resulting in spoilage which quickly renders the meat unfit as food. The need for meat preservation existed long before mechanical refrigeration was developed, and as a consequence, through the centuries there has been developed a large number of meat preservation processes utilizing "curing," smoking, dehydration, cooking and the use of artificial preservatives of various sorts.

The present invention is directed to improvements in that branch of the meat preservation art wherein dehydration is a principal factor.

Heretofore, fresh meat has been preserved by dehydration, familiar examples being dried beef, dried mutton, pemmican, "jerked beef" and "dry sausage" of many kinds, e. g., "summer sausage." The procedures for preparing these meat products have certain steps in common, namely, the addition of a "cure" followed by a slow drying either in the air and sunlight or in the "drying rooms." The preparation of "summer sausage" is exemplary and illustrates the limitations of the general method and the results.

Historically, "summer sausage" was the meat product prepared during the colder months for use during the summer months when fresh meat could not be kept for any appreciable length of time. In the preparation of "summer sausage," fresh beef, with additions of fresh pork or mutton, when available, is ground and to the ground meat there is added a "cure" composed of ordinary salt, sugar, spices, sodium or potassium nitrate and frequently, a small amount of sodium or potassium nitrite. One purpose of the cure is to act as a preservative for the meat during the long drying period, particularly while it still contains most of the water present in its natural state. The original moisture content may vary from 45% to 85%, depending upon the amount of fat meat and pure fat added to the lean meat in making up the mixture. The cure also assists in preserving the final product during storage. Another purpose is to produce a red product of pleasing appearance and to impart desirable tastes to it. The concentrations of cure in the product increases upon drying, because of the large amount of water evaporated, and the final products are highly seasoned. Accordingly, the familiar "dry" or "summer sausage" receipt typically includes from 3 to 3½% salt, 0.10 to 0.16% sodium or potassium nitrate (and sometimes about 0.03% sodium or potassium nitrite), 0.5 to 0.6% sugar and a wide variety of spices in varying amounts. The percentages just given are based upon the weight of the fresh meat. The "sausage mixture" is stuffed into casings and hung up to dry in a "drying house" for a period of 20 days to 90 days or more. The final moisture content may vary between 28 and 40 per cent, depending upon the type of sausage. The dry, usually rather salty and spiced product, is highly nutritious and need not be cooked before eating. It is sometimes smoked, and infrequently is steam-cooked during manufacture, the latter product being known as "cooked salami."

The amount of "cure" and the drying time were initially established by historical development of the art and now in part are controlled by law, primarily for the purpose of controlling trichinae. About 20 days drying time is required reducing the moisture content of very small sausages and usually 60 days or more are required for average sizes. These drying times exceed the required legal trichinae control limits which specify not less than 20 days drying time for a sausage mixture containing 3⅓% salt stuffed in casings not more than 3½ inches in diameter. The long drying times being used result in high operating, maintenance and inventory costs.

According to the historic method now used, the meats are packed into round sausage casings and hung in a drying room. Shapes other than cylinders are difficult to produce. The finished sausage is always driest near the surface and when cut across, color "rings" are sometimes visible. These are due to variations in moisture content and concentration of cure at increasing distances from the outer surface.

The amount of "cure" used in the "summer sausage" mixture is capable of inhibiting bacterial decomposition, but the cure is ineffective to stop mold and slime growth on the sausage. In the "drying rooms" of commercial packing establishments, mold growths on sausages is such a serious matter that frequently a crew of workmen is required to scrub the sausages and wipe off the mold and slimes forming during the process of drying.

The loss and quality degradation due to molds and slimes is a serious matter in the commercial manufacture of the so-called "dry sausages."

The "sausage" cure and drying has its counterpart in other dried meat processes such as the preparation of dried beef, mutton, "jerked" beef, etc. In each, the cure is added in sufficient amount to inhibit deterioration of the fresh, initially moist meat, and drying is carried out over a lengthy period. All such meat products, i. e., the dry sausages, dried beef and mutton, "jerked" beef and the like are subject to mold and slime deterioration whenever moisture is encountered during manufacture or storage. Such products, particularly sausages, are variable in moisture content from the surface to the center of the piece. All of the aforesaid products are subject to the objection that the "cure," added in sufficient quantity to preserve the meat when it is fresh, is high or excessive in the finished product. Hence, such meats are very salty or highly spiced (to taste) and an excessive amount of "cure" is in the meat after water has been removed. The possible range of taste in such dried products is therefore limited by the requirement that during the initial drying, such a "cure" or salt concentration must be used so as to prevent spoilage. To many persons, the excessive saltiness or seasoning of these products renders them indigestible or at least of inferior palatability as compared with fresh meats.

It is an object of the present invention to provide improved processes for overcoming these difficulties in prior meat treating processes, and more particularly (1) to provide processes wherein the time of dehydration is very greatly reduced, for example, from many days drying time to, in some instances, but a few hours drying time; (2) to provide processes wherein because little or no "cure" is required for preservation of the meat during the rapid dehydration, additions of "cure" or salt and seasoning before or after dehydration are thus adjustable to such amounts as are agreeable to taste and needed for preservation, palatability and appeal of the final low-moisture product; (3) to provide processes wherein due to the rapidity of the processes, the development of molds, slimes, bacteria and other microbiological disturbances during drying are reduced or eliminated; (4) to provide new products having a range of palatability and tastes which are, for the first time, made feasible by the more variable nature and amounts of "cure" of the rapid processes as compared with existing processes; (5) to provide new products wherein other shapes than cylinders can be readily produced, and (6) to provide new products without casings.

It is also an object of the invention to provide improved processes of preparing dehydrated meat products which make feasible better control of the properties of the product, the curing processes, drying operations, control of the large variety of enzymatic and microbiological process taking place during drying, and control of uniformity of the product as to taste, keeping quality, moisture control, color, etc.

Insofar as the packaging of meat products is concerned, the processes of the present invention permit a much greater flexibility than heretofore obtainable. In the making of "dry" or "summer sausage" for instance, it has heretofore been the uniform practice to stuff the meat and cured "sausage mixture" into casings and then dry in one continuous operation to the finished stage. This resulted in the familiar dried "sausage" of generally cylindrical shape, sometimes deeply wrinkled due to loss of volume. The sausage is not adapted to neat packaging.

In use, such sausage shapes are frequently exceedingly wasteful. Thus, in the preparation of "emergency rations" for the armed air, naval and army forces, the "single-meal" ration is packaged in a rectangular vacuum-sealed metallic container. A cylindrically shaped sausage will not fit into such a container without wasting space, a factor of major consideration. For neat packaging, the sausage must be trimmed to size and this also involves much waste.

According to the present invention, it is possible to prepare a "skinless" sausage or skinless dehydrated meat product having either the usual degree of "cure," or a product having only as much salt and seasoning or other ingredients as is desirable for seasoning to taste or for exerting a minimal preservative action required for the final dried product. Such products may be fabricated into any desired shape, cylindrical, rectangular or otherwise, or be merely bulk material of irregular shapes. Thus, a meat ration precisely fitting any selected portion of an "emergency ration" container may be prepared.

The gut-processing costs of usual sausage making procedures and the aesthetic objections of many people to these can thus be eliminated. In the same manner, need for synthetic sausage casings is eliminated.

It is an object of the invention to provide such products and the process of producing the same.

Other and further objects of the invention are those inherent in the invention herein described and claimed.

In carrying out the present invention, fresh meat, which may be beef, mutton, pork, lamb, chicken or the like is first freed of bone, gristle, and sinew. The meat is maintained at a temperature sufficiently low that the fatty portion of the meat is hard, so that the fat does not readily smear. For beef and pork, the fat is sufficiently solid in the temperature range of about 0° to 30° C., but the preferred range is about 0° to 10° C. The purpose of chilling is to prevent smearing fat over the meat during the cutting and forming steps which follow, as smearing of the fat impedes subsequent drying and may be detrimental to the appearance of the product.

The suitably chilled meat is then finely comminuted by slicing into fine pieces or by grinding. The pieces are comminuted so as to be no thicker than ¾ inch at the thickest portion and should preferably be reduced to smaller sizes for best results. An ordinary rotary cutter machine serves excellently for the comminuting operation. For some operations, it is then desirable to extrude the cut meat in thin "ropes" one-half inch in diameter or smaller.

Other types of meat grinding or meat cutting machines capable of reducing the meat from large blocks into small shapes such as sheets or chunks may also be used.

The addition of "cure" i. e., sodium or potassium nitrate and optional sodium or potassium nitrite in small amounts, sugar, salt, pepper, spices, other condiments and flavoring materials and the addition of non-meat proteins, meals, gelatin, vegetables, fruit and similar substances may best be accomplished during the stage of comminuting the meat in the rotary cutter or similar machine. While the addition of "cure" is not essential for preservation of the meat during the subsequent drying period, a reduced amount of "cure" may be added for color control and for assisting in preserving the dried meat during subsequent storage. A full percentage of "cure" may be added merely for adherence to historic receipts, or such amounts may be added as are required or desired for taste, color and keeping qualities, the latter depending mostly upon the purpose of the product and its conditions of storage.

The addition of "cure" and condiments for the purposes outlined above may, in some processes, also be made when the meat is partially dried and while it is being reworked during forming or pressing as hereinafter described.

It may be pointed out that water extraction serves to increase the percentages of salt and all other additions and condiments as the product approaches the final low moisture condition. Thus, to the average person, a product having 2½% salt tastes flat, 2½ to 3% salt tastes "not sufficiently salted," from 3 to 4% has the correct saltiness, and more than 4% is "too salty." In dried foods, such as sausage, the initial salt concentration of 3½% increases to at least 5% when the product is dried. These products therefore taste "salty." This degree of saltiness, previously required in carrying out the sausage making process, is no longer necessary when using the present invention. Hence, a host of new and more palatable receipts wherein salt is not the predominant flavor are made available by this invention.

As the present invention contemplates reduction of the water content from the initial range of 45% to 85% to 20% to 40% in the final dried product, salt concentration is correspondingly increased by water removal. A final product having 28% moisture and 3½% salt (i. e., properly salted but not "salty" to taste) requires only 2.7% salt where the fresh meat has 55% moisture, and 2.55% salt where it has 65% moisture. Similarly a final product of 40% moisture and 3½% salt where the fresh meat has 55% moisture and 2.8% salt where it has 65% moisture. For a final salt percentage of 3% or 4%, the amount of salt added to the fresh meat is correspondingly decreased or increased over the figures just given. The 3% to 4% range of salt in the final product has just a proper degree of salt for most tastes; it does not taste "salty" as does ordinary "summer sausage" or "dried beef." Other condimenting additions are likewise reducible or variable as the salt flavor becomes less prominent, with a consequent new range of flavors in the final products.

As soon as the fresh meat is finely cut, chopped or ground and the requisite "cure" and condiments added, the meat is spread out in a relatively thin layer for drying. For this purpose, the layer should be of such a thickness that no part of the meat is more than ¾ inch from a drying surface and for quickest drying the meat is preferably arranged in thinner sections. Extruded sections of ground meat ¼ to ½ inch thick laid lengthwise along a screen-wire tray made of perforated metal or wire cloth, gives excellent results. The trays containing the spread-out lengths of extruded meat are then placed in a dryer and a stream of air is passed over, through or around the meat.

The air stream should be maintained at a temperature of 0° to 30° C. preferably 0° to 20° C. and moisture content of the air should not exceed 75%, preferably not more than 50% relative humidity, if the drying process is to be carried out with optimum speed. This can be accomplished by recirculating all or part of the air in the dryer through a dehumidifier and temperature regulator. Velocity of the air and consequently the turbulence of the air is important, the desideratum being turbulence of the air in contact with the meat. In this way, the moisture of the meat is rapidly scrubbed away. A velocity of 1 to 18 feet per second at the meat will achieve this purpose depending mostly upon the size of the material and upon the stage in the drying.

During the initial stages of drying, moisture is evaporated from the relatively wet surface of the meat and turbulence of the air at the surface is most helpful in quickly carrying away the moisture. Thus, for drying ⅜ inch "ropes" of meat from 55% to 40% moisture, increased air velocity from 1 foot per second to 18 feet per second decreased the drying time by about 40%. As drying progresses, the mechanism of moisture loss increasingly depends upon the rate of migration of moisture from the deep sections of the meat to a drying surface. As the migration rate is slower than the maximum evaporative rate at the surface, the benefit of turbulence is correspondingly reduced during final stages of drying. The ratio of surface area to volume also influences the benefits obtainable by turbulence of the drying air.

The drying time is very short, being (in some instances) a matter of a few hours rather than months. In a typical run according to our procedure, a moisture reduction from 55% to 28% (28% being a moisture content of very dry "dry sausage") was accomplished in about 8 hours for "ropes" of ground sausage meat ⅜ inch in diameter at a temperature of 19½° C. relative humidity of 25% and a superficial air velocity of 10 feet per second. The reduction from 55% moisture to 40% moisture was accomplished in about 3 hours.

In another typical run, according to our procedure, a moisture reduction from 55% to 28% was accomplished in 13 hours for "ropes" of ground sausage meat ⅜ inch in diameter with air at temperature 19½° C. relative humidity of 50% and a superficial air velocity of 10 feet per second. The reduction of moisture from 55% to 40% was accomplished in about 4 hours.

In still another typical run, a moisture reduction from 55% to 28% was accomplished in about 15 hours for "ropes" of ground sausage meat ⅜ inch in diameter with air at a temperature of 16° C. relative humidity of 69% and with a superficial air velocity of 10 feet per second. In this instance, the reduction to 40% moisture content was accomplished in 5 hours.

The invention is very useful for the production of skinless rectangular or slab sections of sausage or other meat mixtures of which "emergency rations" for armed forces is a good example. For this purpose, a single meal meat-ration requires a rectangular slab about 1 inch thick, 2 inches wide and about 3½ inches long, and for packaging it is most necessary that the slab be rectangular or nearly so. Such a dried-meat, skinless rectangular slab of good quality cannot be produced by ordinary sausage making technique but can be readily produced by the present invention.

Thus, an extruded length of sausage meat mixture about 1¼ inches thick and 3½ inches wide (sectional dimensions) and about 3 feet long was placed on a wire cloth tray and dried with air having a temperature of 50° F., relative humidity of 50%, and a superficial velocity of about 10 feet per second. A moisture reduction from 55% to 28% was accomplished in 15 days and the final product was cut into lengths 2 inches long and vacuum-sealed in tins as "emergency rations" for the armed forces. The tins were not cooked. The product was of good color, fine tasting and kept well under adverse (oriental) conditions.

In another run illustrating about the maximum limit of drying temperature, a similar sausage mixture of the same rectangular cross-section size was dried with air having a temperature of 70° F., a relative humidity of 20% and a superficial air velocity of 10 feet per second. The moisture reduction from 55% to 28% was accomplished in 14 days. The product was very satisfactory and edible. However, for usual drying, a lower drying temperature is preferred.

By way of comparison, a piece of the same rectangular section sausage meat was dried in a usual sausage drying room. The air conditions in the drying room were, air temperature 50° F., relative humidity 50% and the air velocity somewhat less than 1 foot per second. After 30 days, the moisture was reduced to about 35%, but the product was inferior and unpalatable because of rancidity, and because the fat portions had "bled" over the surface of the product making it ill tasting and of poor appearance.

The thickness of the meat pieces undergoing drying, whether merely comminuted or extruded in sections or molded into blocks, is adjusted so that drying to the final moisture content is achieved before rancidity occurs on the surface of meat. Taste sensitivity to rancidity appears to vary with individuals, but as a general guide, it appears that at temperatures of 10° to 20° C., no appreciable rancidity occurs in 20 to 30 days; hence the thickness is so adjusted that the moisture reduction at the deepest meat section is sufficient within that period. For average drying condition, it is safe to use meat sections having no portion more than ¾ inch from a drying surface. Thus, a molded block or extruded section of sausage meat 1½ inches thick can be safely dehydrated, without development of rancidity, within 15 days under drying conditions herein specified. Better results in respect to speed of drying and amount of moisture reduction may be obtained by using thinner sections and this is recommended wherever possible.

The allowable exposure to air may be increased by utilizing an antioxidant such as lecithin, trimethyl hydroquinone or other antioxidants of which there are many available, in the mixture and on the exposed surfaces, or the product may be smoked. "Smoking" exerts an antioxidant effect and produces a distinct flavor.

During the relatively short period of drying under the conditions herein specified, microbiological reactions such as the growths of bacteria and mold and slimes and the reactions of enzymes make no detrimental progress.

The range of usefulness of the invention is further illustrated by the following examples which should not, however, be construed as limitations upon the invention:

*Example I*

*Dehydrated meat.*—(a) Fresh beef, pork or similar meats are freed of bone, gristle, sinew, skin and extraneous matter. The proportion of fat to lean in the meat may be varied widely depending upon whether a high fat content or low fat content final product is desired. The lean meat and fat in desired proportions are maintained at a temperature within the range of 0° to 30° C., preferably 0° to 10° C., where pork fat is present in appreciable quantities, and the mixture is then comminuted into small chunks or slices. Maintenance of a low temperature at this stage is desirable as it enables the cutting operation to be carried out without smearing the fat over the cut surfaces of the meat. The sizes of the comminuted meat pieces should be such that no portion of the interior volume of the piece is greater than ¾ inch from the surface of the piece, and for best results, should be no greater than ¼ inch. The comminuting is preferably carried out in a rotary cutter machine, although obviously other machines capable of grinding or cutting meat may be used, or the meat may be cut or chopped by hand.

The meat is then forced through an extruding horn having circular orifices ⅜ inch in diameter, thus producing "ropes" of meat about ⅜ inch in diameter. These are placed parallel in spaced relationship on a tray made of ¼ inch mesh galvanized iron wire.

A convenient method of carrying out this operation is to use an extruding horn having a plurality of holes spaced from each other ¼ to ½ inch and in a row along the horn. This may be conveniently attached to an ordinary sausage shaping unit. There may be sufficient "holes" so as to extrude a number of "ropes" parallel and simultaneously. Then as the "ropes" are simultaneously extruded, a tray is drawn along under the ropes at a speed equal to the rate of extrusion so that the "ropes" of meat lie in neat parallel rows evenly spaced on the tray. The tray may be made just wide enough to take all the "ropes" simultaneously extruded by the horn and may be of any desired length. An endless "belt" of wire mesh may be drawn under the ropes and directly and continuously into the dehydrator, countercurrent to the dehydrating air stream, if desired.

The trays of "ropes" of freshly extruded meat (or the endless belt carrying the "ropes") then pass into a dehydrator where an air current is passed over and through the trays. The temperature may be within the temperature and humidity range aforesaid. By illustration in this example, air having a temperature of 19°–20° C., and a relative humidity of 25% is passed over the meat for 3 to 8 hours, thereby reducing the moisture content to 20 to 40%. It is possible to increase greatly the load of meat per tray without greatly increasing the drying time by using 2 or more layers (laid cross-wise).

(b) If desired, salt, sugar, pepper, spices, small amounts of sodium nitrate and sodium nitrite may be added to the meat during comminution in a rotary cutter or similar cutting or grinding operation. The additions of salt, sugar, pepper and spices may be large or small depending on whether a "salty" sausage-like final product is desired or whether it is merely desired to season to taste. "Cure" is not needed for preservation of the meat during drying as drying is accomplished in but a few hours and consequently the percent of "cure" may be reduced in amount (as compared with "dry sausage" receipts) to a minimal quantity for assisting in the preservation of the final dried product. This minimal amount depends upon the residual moisture and upon the conditions of storage as well as on the time of storage anticipated.

*Example II*

*Molded dehydrated meat product.*—In producing a molded shape of specific dimensions, for example, for use in packaging or in emergency ration kits, the meat is prepared as in Example I either with or without "cure" salt, sugar, pepper and condiments, depending upon whether the product is to be eaten directly or used as an ingredient in soups, stews, etc. The meat is then molded into shape according to any of the following plans:

(a) The meat in rope or other form is dehydrated until the moisture is 20 to 40% as in Example I, and then is broken up and mixed, in a suitable working machine such as a dough working machine, preferably but not necessarily of the vacuum type for removal of residual air in the mixture. Prior to mixing and working, the dehydrated meat is preferably aged a day or two, to allow the remaining moisture to equalize throughout the pieces, and the meat is then chilled to a temperature in the range of 0° to 20° C., preferably 0° to 10° C., so as to avoid smearing of the fatty parts of the meat on the lean parts during working and mixing. If additions of "cure," i. e., salt, sugar, pepper, condiments, etc., were not made to the fresh meat starting material, these, and if desired, antioxidants for the control of rancidity, may be added to the preliminarily dried product during working and mixing. The quite stiff dough-like meat mass is then placed in molds of any desired shape and pressed at 50 to 500 pounds per square inch into pieces of desired size, or may be extruded (with the desired cross-sectional dimension). Thus, for the "meat" of a single meat ration can, the product may be molded into a rectangular block or precise dimensions to fit a portion of the can.

The molded meat is then taken out, if desired, and further dried for a short period with forced draft air as specified in Example I. The finished pieces may be covered with antioxidant powder or smoked or both. Smoking not only influences the taste of the final product, but also acts as an antioxidant, preventing rancidity.

For example, in preparing an army "meat" ration, a meat mixture of 250 pounds of meat, consisting of 75 pounds of beef chuck, 85 pounds of regular pork and 90 pounds berliner and cure consisting of 8 pounds and 5 ounces of sodium chloride, 4¾ ounces sodium nitrate, 1 pound sugar, 2¼ ounces of corriander and 1 pound of peppercream is comminuted and mixed in a rotary cutter or similar machine and is then extruded in rope form (⅜ inch to ½ inch diameter) onto screens. The "rope" meat mixture is then preliminarily dried on the screens by forced turbulent draft of air having a superficial velocity of 5 to 10 feet per second, a temperature of 15° to 20° C., and a relative humidity of 25% or less. In 3 to 5 hours, the moisture content is reduced to about 40%. The partly dried meat is aged for 2 or 3 days to allow moisture to equalize and is then chilled and kneaded, preferably, though not necessarily, in a vacuum mixer. It is molded under 50 to 500 pounds per square inch pressure into molds 1 inch by 2 inches by 3½ inches. The molded blocks are then placed on the screens and dried with forced draft 3 to 4 days at 16° C., 50% relative humidity, the final moisture content being about 25 to 28%.

When drying in block form, the molded blocks should be of such dimensions that no part of the meat is more than ¾ inch from an exposed surface, so that the required moisture reduction may be accomplished prior to development of appreciable rancidity.

The final product is delicious and nutritious and depending on the receipt may be bland flavored, mildly salted and condimented or heavily salted and condimented as in the usual "dry" sausage receipts. For army rations and other uses requiring storage under possible adverse hot or moist conditions, the product may be treated with an antioxidant in small amounts, or smoked both for flavor and keeping qualities. Even a mildly salted and cured product will not spoil under suitable conditions of storage. For inhibiting mold growth and other microbiological disturbances, the product is enclosed in air and moisture tight wrapping or sealed in a ration can.

(b) The fresh meat either with or without salt, pepper, "cure," etc., when comminuted or in "rope" form after comminuting is spread on trays and dried as described in Example I until the moisture content is 40 to 55%. In this preliminary dried condition, the meat is fairly pliable and may, after chilling, be reworked in a kneading mill such as a dough mixer and then stuffed into sausage casings in a well-known manner. During reworking, salt, pepper, "cure," etc., if not already present, may be added in amounts depending upon whether if the final product is to be merely sufficiently seasoned and salted or have a "salty" sausage flavor. The thus partially dried sausage in casings is then dried for 2 to 15 days with a forced draft of air at 15 to 20° C., 25% to 75% humidity. As previously explained, the velocity of the air at the meat (turbulence) is of decreasing importance as drying progresses and hence as a partially dried meat was used, the air velocity may permissibly be reduced under the conditions of this example for the final drying. The final moisture content of the sausage is 20% to 40% depending upon the size of casing and variations in time, temperature and humidity of the air.

This is an illustration of a way of making standard "dry sausage" (summer sausage) in casings, in from about 15 days at the most, as compared with prior methods requiring 60–90 days' drying time. According to accepted sausage making procedure, 60–90 days' drying time is required for a 3½ inch casing where the entire dehydration is carried out in the casing by hanging in a drying room, whereas by utilizing the present procedure of drying the sausage mixture on trays to about 40% to 55% moisture, then reworking and stuffing into casings and finally drying to 25% to 28% moisture, only 15 days or less drying is required for the reduction of moisture in medium size casings. During this short period, bacterial decomposition, mold and slime growth all are inconsequential since the primary moisture reduction to 40% to 50% is accomplished in but a few hours. In prior sausage making procedures, the large initial moisture content, maintained for many days, so facilitated bacterial growth and growth of molds, slimes and the like, that packing houses required considerable expenditure of labor in the drying rooms to wipe off the heavy growths on the drying sausage. A manifestly large reduction of spoilage loss and amount of inventory is made possible by the process herein disclosed. The water content of the partially dried meat at the time of stuffing determines the ease of stuffing into casings as well as the adherent nature of the meat particles in the finally dried sausage. Good results are obtained at residual moisture of 40% (based on meat) having an initial moisture of 55%.

*Example III*

*Soup, stew and ration mixture.*—The meat is freed of bones, sinew, gristle and skin as in Example I and then chilled to 0° to 30° C., and placed in a cutter mixer, such as a rotary cutter machine, along with wet or already dried or partially dried vegetables such as carrots, celery, cabbage, potatoes, fruits, tomato pulp, whey, yeast, soya bean flour, meal, and antioxidants such as lecithin, if desired, and a small amount of cure, salt, sugar, pepper, spices and herbs. The entire receipt is comminuted while chilled and incidentally mixed. These non-meat additions to the meat may be made while the meat is wet, or after partial or complete drying. The comminuted mass is then spread out, with or without extrusion into "ropes" as in Example I, and is dried on screens with forced air having a temperature of 0° to 30° C., relative humidity of 75% or less and a velocity sufficient to produce turbulence, preferably 10 feet per second or more.

When drying at about 20° C., 25% relative humidity and air velocity 10 feet per second, the moisture is reduced to about 40% in 5 hours and to about 30% in 10 hours. The dried mixture may be put up in air and water-tight wrappings or molded into blocks or wrapped or packaged in metal or glass containers and is capable of long storage without appreciable deterioration under average storage conditions prevailing in wholesale and retail stores. Alternatively, the mixture may be extruded as a sheet, slab or selected shape and dried. The mixture, when cooked with water, makes a delicious, nourishing stew or soup, or may be eaten without further preparation as a meat ration.

The soup, stew or ration mixture may, if desired, be preliminarily dried to about 50 to 60% moisture and then pressed into blocks and dried as in Example II or pelleted and subsequently finished dried for 5 hours to several days until the moisture content is reduced to 20 to 30%. By the addition of non-meat proteins such as soya bean meal, the nutritive qualities may be enhanced for special purposes.

Many modifications are possible in carrying out the invention. Thus the comminuted high moisture content meat or meat mixture may be stored or aged 24 to 48 hours in layers 6 inches deep on trays as is customary in sausage manufacture, and may be mixed in a dough mixer, if desired. For extruding, a special horn is affixed to a standard sausage stuffer for extruding "ropes" for drying, as aforesaid, or a thin sheet of the meat ¼ to 1½ inches in thickness may be extruded onto a moving belt or trays moving under the extruded sheet and at the same rate. In some instances, a horn of rectangular cross section or modified rectangular cross section may be used and ropes of that section extruded and finished-dried in one operation. The long lengths of finished-dried material are cut into short pieces and packaged. The extruded form warps slightly in drying, but by extruding an appropriate modified rectangular shape (i. e., a rectangle slightly bulged on the sides), the product, when dried and shrunk, will be sufficiently rectangular for reasonably accurate packaging.

For manufacturing army emergency rations, slabs may be extruded and finished dried, then cut to desired dimensions and vacuum packed in tins to inhibit mold growth and rancidity under long and adverse storage conditions.

In general, it may be stated that for packaging for storage over long periods, the package must be tight against water, water vapor and air, and must fit tight or be evacuated so as to exclude air. Pliofilm wrappings or metal or glass containers evacuated fulfill these conditions and entirely eliminate molds and rancidity. The meat and meat containing products of this invention are, of course, neither cooked nor sterilized, but remain highly nutritious and palatable and when properly packaged will keep indefinitely under any conditions likely to be met.

Concerning the products resulting from the foregoing procedure, it may be stated generally that the meat has a good red color. Consistency varies, and depends upon the final moisture content, amount of fat present, whether additive materials, such as vegetables, cereals, non-meat proteins, gelatine and the like are present, and the amount of moisture present when reworked and mixed (as in the procedures that utilize two stages of drying). The consistency may therefore range from hard and tough to as soft as sandwich spread materials, the hard and tough product being resultant from a high meat content mixture dried in one operation to about 20 to 25% moisture. A product of less adherence is obtained by drying ropes on thin sheets to say, 28% moisture in 3 to 8 hours, then kneading at 0° to 30° C., pressing into shapes and redrying to final dryness.

Since trichinae control requires 15 to 20 days' storage for pork-containing meat mixtures, the rapid 6 to 10 hour single-step drying procedure offers most advantages when applied to meat compositions which do not contain pork. However, by using "frozen trimming" instead of freshly slaughtered pork, the trichinae control storage period is avoidable and the rapid single-stage drying period can be used with pork, and the product immediately sold. The use of "frozen trimmings" does, however, increase the rate of rancidity development and must therefore be counteracted by the use of appropriate antioxidants as herein specified.

Since the drying steps in the processes of the present invention are carried out under controlled and regulatable conditions and are of relatively short duration (as compared with prior process) it is possible accurately to control and regulate the factors of taste, quality, keeping properties, color and moisture content from batch to batch with far greater uniformity than heretofore obtainable.

A full range of equivalents is regarded as within the purview of the invention set forth in the appended claims.

We claim as our invention:

1. A process of rapidly preparing a dried meat product which comprises comminuting meat having a natural water content of 45% to 85% at a temperature below the softening point of the fatty portions of the meat, placing the thus comminuted meat in a relatively thin layer, forcing an air current against the surface of the meat at a sufficiently high velocity to cause turbulence of the air, said air being at a temperature of 0° to 30° C., and having a relative humidity of less than 75% until the moisture content is reduced to 20% to 55%.

2. A process of rapidly preparing edible dried meat products capable of being stored for long periods of time, which comprises comminuting fresh meat having a natural water content of 45% to 85% at a temperature below the softening point of the fatty portions of the meat, admixing the meat with sodium chloride, spreading the finely cut meat mixture in a thin layer, forcing an air current against the surface of the finely cut meat at a sufficiently high velocity to cause turbulence of the air, said air being at a temperature of 0° to 30° C., and having a relative humidity of less than 75% until the moisture content of the meat is reduced to 25% to 40%, the sodium chloride being present in an amount sufficient that the final product, when eaten in its dry condition, is properly seasoned to taste but not salty to taste.

3. The process of rapidly making an edible dried meat product into a solid block of predetermined shape which comprises finely cutting fresh meat having a natural water content of 45% to 85%, said cutting being carried out at a temperature below the softening point of the fatty portions of the meat, spreading the finely cut meat in a thin layer, forcing air across the surface of the meat, the air being forced sufficiently rapidly so as to be in a state of turbulence, said air having a temperature of 0° to 30° C., and a relative humidity of less than 75%, until the water content of the meat is 40% to 55%, then pressing the thus partially dried meat product into a mold of desired configuration, and then further drying the thus formed molded pieces of meat until the water content of the meat is between 20% and 40%.

4. The process of claim 3 further characterized in that sodium chloride is added to the finely cut raw meat in an amount sufficient so as to be present in the dried product in an amount for properly seasoning to taste but not salty to taste.

5. The process of claim 3 further characterized in that sausage "cure" is added to the meat so as to be present in amounts normal for "dry sausage."

6. The process of claim 3 further characterized in that the preliminarily dried meat is mixed and then stuffed into sausage casings as the mold of desired configuration.

7. The process of claim 3 further characterized in that the partially dried meat is allowed to stand from one to several days, then chilled to a temperature in the range of 0° to 30° C. and worked by mixing, and then formed into shapes of desired configuration.

8. The process of rapidly making an edible dried meat product which comprises comminuting fresh meat having a water content of 45% to 85% while the meat is maintained at a temperature in the range of 0° to 30° C., extruding the meat in strips, arranging the strips of meat in a layer, drying the meat by forcing air having a temperature of 0–30° C., and a relative humidity of less than 75% into turbulent contact with the meat until the moisture content of the meat is from 20% to 40%.

9. The process of claim 8 wherein a number of strips of meat are extruded simultaneously parallel and spaced from each other onto a moving drying tray moved beneath the meat.

10. The process of claim 8 wherein a number of strips of meat are continuously extruded simultaneously parallel and spaced from each other onto an endless carrying web moving into engagement with the strips of meat for supporting them, and continuously moving the web into a drying chamber where the air is forced turbulently countercurrent to the movement of the meat carrying web.

11. The process of rapidly producing shaped blocks of "dry sausage" which comprises extruding a web of comminuted sausage meat mixture composed of meat and "cure" onto a drying frame, and drying the sausage meat mixture by turbulently forcing into contact with the meat an air stream having a temperature of from 0° to 30° C., and a relative humidity of not more than 75% for not more than 15 days, said web of comminuted sausage meat being not more than 1½ inches thick.

12. The process of claim 11 further characterized in that the dried sausage meat mixture is cut transversely into rectangular blocks.

EDGAR L. PIRET.
EDWARD C. RITCHELL.